J. A. McCLURE.
SKID.
APPLICATION FILED DEC. 1, 1911.
1,064,237.
Patented June 10, 1913.
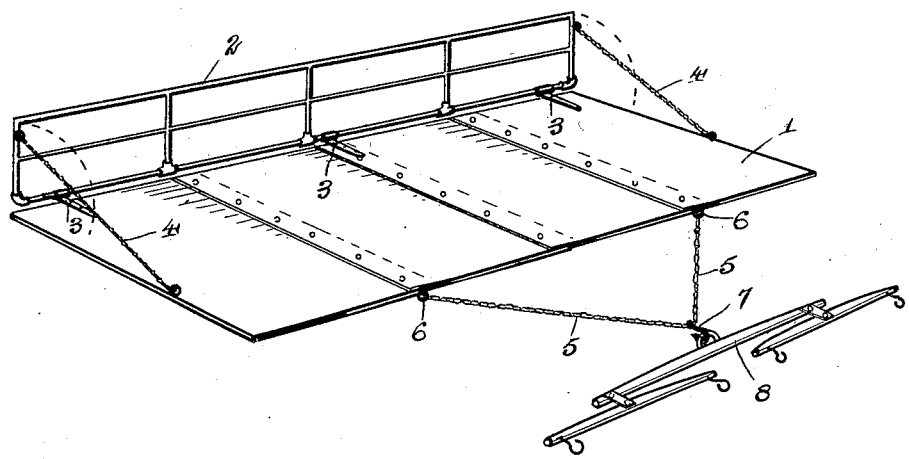

UNITED STATES PATENT OFFICE.

JOSEPH A. McCLURE, OF BEMIDJI, MINNESOTA.

SKID.

1,064,237. Specification of Letters Patent. Patented June 10, 1913.

Application filed December 1, 1911. Serial No. 663,411.

*To all whom it may concern:*

Be it known that I, JOSEPH A. MCCLURE, a citizen of the United States, and a resident of the city of Bemidji, county of Beltrami, and State of Minnesota, have invented certain new and useful Improvements in Skids, of which the following is a specification.

My invention relates to improvements in skids and more specifically to a skid designed for use in hauling hay, alfalfa, etc., and has for its object the production of a device as mentioned through the medium of which hay, alfalfa and the like may be hauled with little expenditure of labor and with great expedition.

Another object is the production of a skid as mentioned which will be of simple construction and efficient in use.

Other objects will appear hereinafter.

With these objects in view my invention consists in the combinations and arrangements of parts hereinafter described and claimed.

My invention will be more readily understood by reference to the accompanying drawing forming a part of this specification, and in which the figure is a perspective view of a device embodying my invention.

The preferred form of construction as illustrated in the drawing comprises a flat rectangular body 1. The body 1 is formed of sheet metal and preferably in sections as shown, the adjacent edge portions of said sections being overlapped and secured together by riveting. Arranged at one of the longitudinal edges of the body 1 is a frame member 2 formed preferably in the manner shown by a number of pipes or rods connected together to form a lattice construction, this being extremely light and economical. The lower edge of the member 2 is swingingly secured to the body 1 by means of hinges 3. Coöperating with the frame member 2 are chains 4 which serve to prevent swinging of said frame member outwardly beyond a vertical position, but permitting however, of said frame member being swung inwardly to a horizontal position upon the body 1. Connected with the opposite edge of the body 1 are draft chains 5 the rearward ends of which connect with eyes 6 provided at said edge of said body, the forwardly projecting ends of said chains being connected with a hook 7 to which is connected a whiffle-tree 8.

In use, the device is drawn upon the ground preferably by horses which are hitched to the whiffle-tree 8, one or two horses being used for this purpose, a single horse having, however, been found sufficient to draw the skid when loaded. The hay or other article to be hauled is loaded upon the body 1, the latter, after the desired amount of hay has been loaded thereon being drawn over the ground to any place desired. In operation it is clear that the frame member 2 serves as a barrier preventing the hay or other article from sliding off of the body 1, the chains 4 also, aiding in preventing lateral displacement. By providing an imperforate body all of the hay loaded thereon will be hauled by the device, since none will be permitted to project through the body into contact with the ground and thus be pulled from the skid. The device lying flat upon the ground, the loading of the hay or other article thereon may be effected with ease and expedition, the elevation of the hay to position upon the device, as is necessary where a hay rake is used being obviated. The under surface of the body 1 being smooth and flat, the same will slide over the ground easily and smoothly, a minimum drawing force exerted upon the draft chains 5 being sufficient in effecting the drawing of the skid.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A device of the character described comprising an imperforate rectangular body made up of sheets overlapped and riveted together at their adjacent edges; a rectangular frame hingedly secured at the rear edge of said body; chains secured to said body and said frame preventing said frame from swinging on its hinged joint farther than in perpendicular relation with said body; and a connection at the front edge of said body by which the latter is dragged on the ground.

In testimony whereof I have signed my name to this specification in the presence of two subscribing witnesses.

JOSEPH A. McCLURE.

Witnesses:
C. J. WOODMANSEE,
ALBERT RHODA, Jr.

Copies of this patent may be obtained for five cents each, by addressing the "Commissioner of Patents, Washington, D. C."